(12) United States Patent
Shen (10) Patent No.: US 7,929,285 B2
(45) Date of Patent: Apr. 19, 2011

(54) ELECTRONIC DEVICE HAVING MOVABLE DISPLAY AND HINGE THEREOF

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 166 days.

(21) Appl. No.: 12/332,361

(22) Filed: Dec. 11, 2008

(65) Prior Publication Data
US 2010/0061049 A1   Mar. 11, 2010

(30) Foreign Application Priority Data

Sep. 9, 2008   (CN) ................ 2008 2 0302056 U (51) Int. Cl.
*H05K 5/00* (2006.01)
*E05D 11/00* (2006.01)
*H04M 1/00* (2006.01)

(52) U.S. Cl. ......... 361/679.21; 361/679.55; 361/679.58; 361/679.26; 361/679.27; 361/679.3; 361/679.56; 455/575.3; 455/575.4; 16/223; 16/330; 16/303

(58) Field of Classification Search ............. 361/679.01, 361/679.02, 679.08, 679.09, 679.3, 679.55–679.59, 361/679.21; 345/156, 157, 168, 169, 184; 455/325, 556.1, 550.1, 90.1, 575.1, 575.4; 200/329; 174/535; 16/330, 303
See application file for complete search history.

(56) References Cited

U.S. PATENT DOCUMENTS

| | | | | |
|---|---|---|---|---|
| 2005/0187024 | A1* | 8/2005 | Cho et al. | 463/46 |
| 2007/0105606 | A1* | 5/2007 | Yoon et al. | 455/575.4 |
| 2010/0027206 | A1* | 2/2010 | Shen | 361/679.21 |
| 2010/0053866 | A1* | 3/2010 | Shen | 361/679.3 |

* cited by examiner

*Primary Examiner* — Jayprakash N Gandhi
*Assistant Examiner* — Jerry Wu
(74) *Attorney, Agent, or Firm* — Zhigang Ma (57) ABSTRACT

A hinge for mounting a rotating member to a main body, includes a shaft, a first interfering member fitting about the shaft and fixed to the rotating member, a container fitting about the shaft and fixed to the main body, and a second interfering member retained around the shaft and non-rotatably received in the container.

2 Claims, 8 Drawing Sheets

ELECTRONIC DEVICE HAVING MOVABLE DISPLAY AND HINGE THEREOF

CROSS-REFERENCE TO RELATED APPLICATIONS

Relevant subject matter is disclosed in co-pending U.S. patent applications (application Ser. No. 12/268,422; filed on Nov. 10, 2008 and entitled "ELECTRONIC DEVICE HAVING MOVABLE DISPLAY", application Ser. No. 12/331,399; and entitled "ELECTRONIC DEVICE HAVING MOVABLE DISPLAY"), which are assigned to the same assignee as this patent application. The disclosure of the co-pending applications is incorporated herein by references.

BACKGROUND

1. Technical Field

The present disclosure relates to electronic devices, and particularly to an electronic device having a movable display and a hinge of the electronic device.

2. Description of Related Art

Electronic devices, such as portable phones, personal digital assistants (PDAs) etc. are becoming more and more popular. Most electronic devices are often equipped with displays for displaying information.

Some electronic devices have displays that are both rotatable and slidable relative to main bodies of the electronic devices. One such electronic device has a display that firstly slides to a predetermined position, and then rotates at this position. A hinge is usually used to rotatably mount the display to the main body of the electronic device. However, the hinge is generally mounted to the display and the main body via many screws. Usually, these screws are so small that it is difficult to install them. It is laborious and time-consuming to manipulate the screws.

Therefore, an electronic device which overcomes the above-described deficiencies is desired.

DETAILED DESCRIPTION

Figure 1:
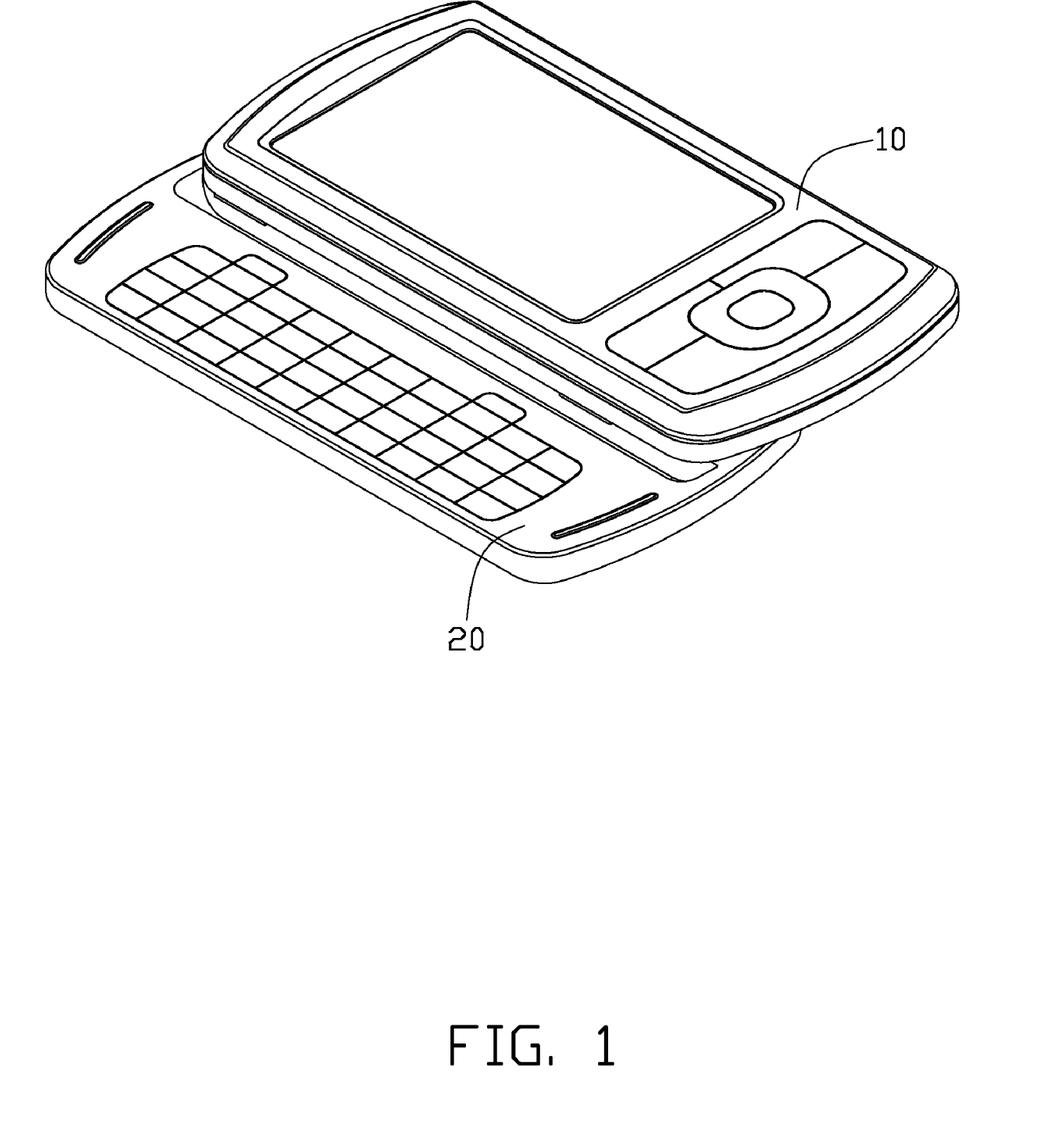
FIG. 1 is an assembled, isometric view of an exemplary embodiment of an electronic device, the electronic device including a main body and a display.
Figure 2:
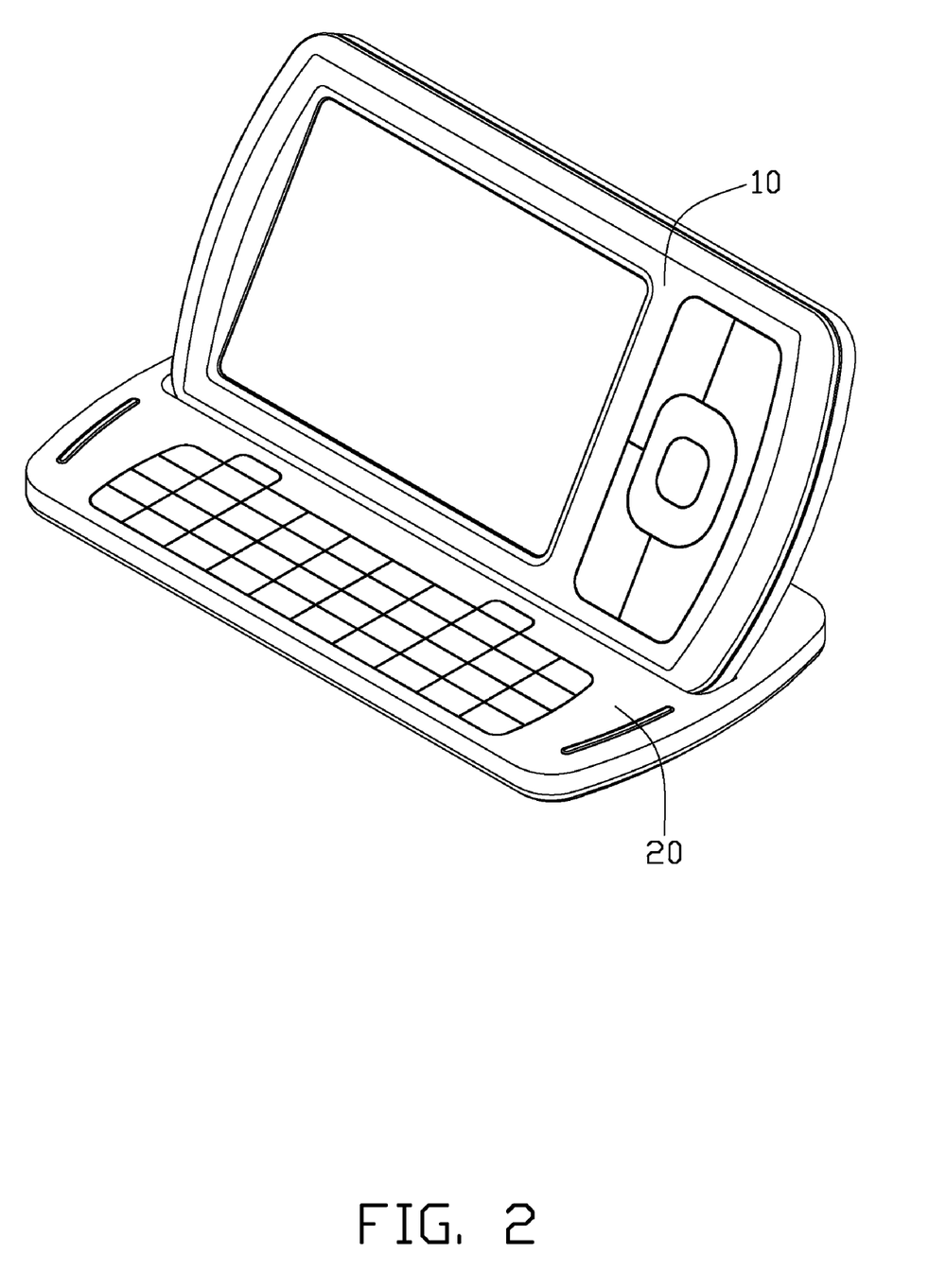
FIG. 2 is similar to FIG. 1, but with the display in a different position.
Figure 3:
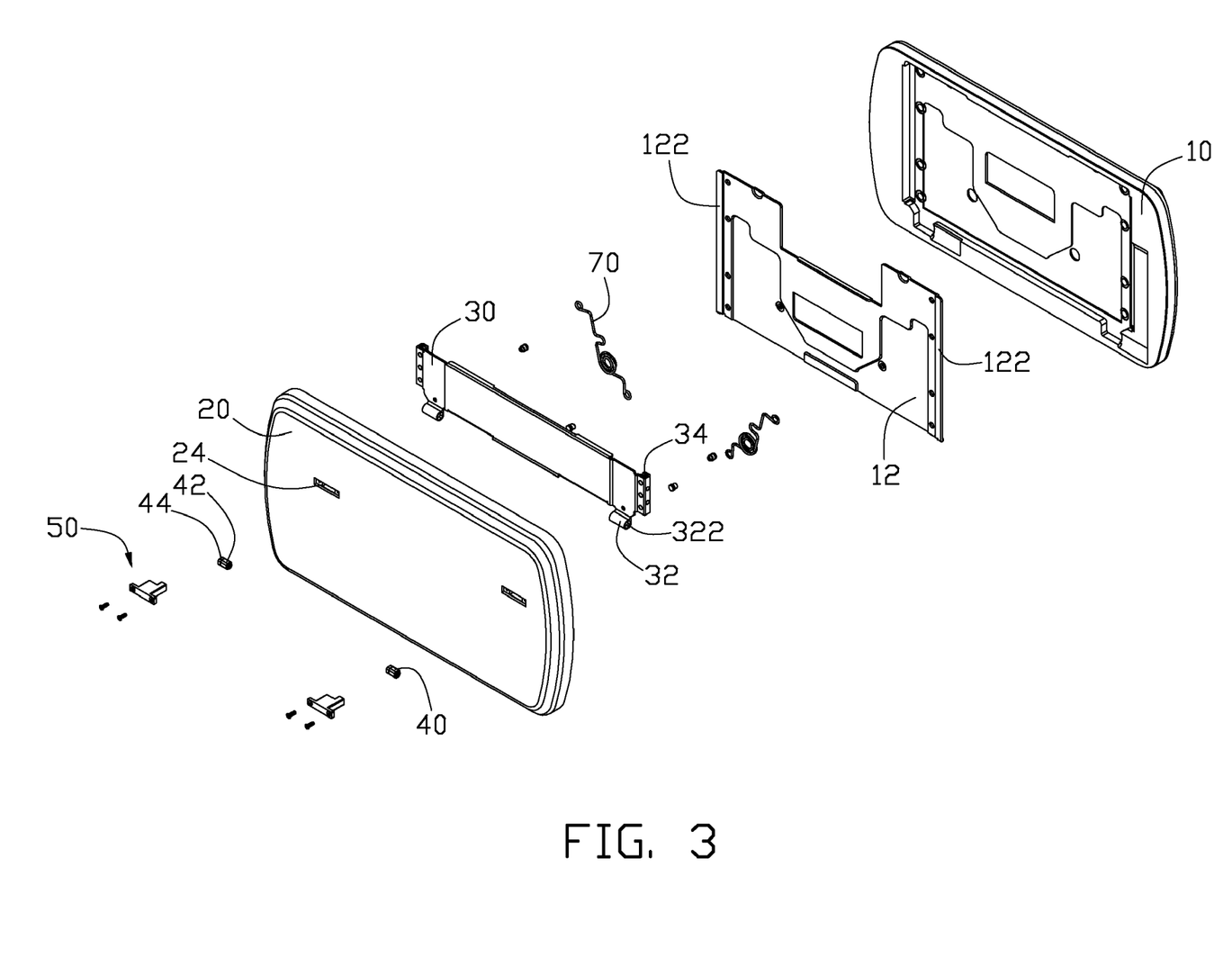
FIG. 3 is an exploded, isometric view of the electronic device of FIG. 1.

Referring to FIGS. 1 to 3, an exemplary embodiment of an electronic device, such as a personal digital assistant (PDA), includes a display 10, a main body 20, a sliding piece 12 mounted to the back of the display 10, a rotating member 30 pivotably mounted to the main body 20, two hinges 40, and two positioning members 50. The display 10 is slidable and rotatable with respect to the main body 20.

Figure 4:
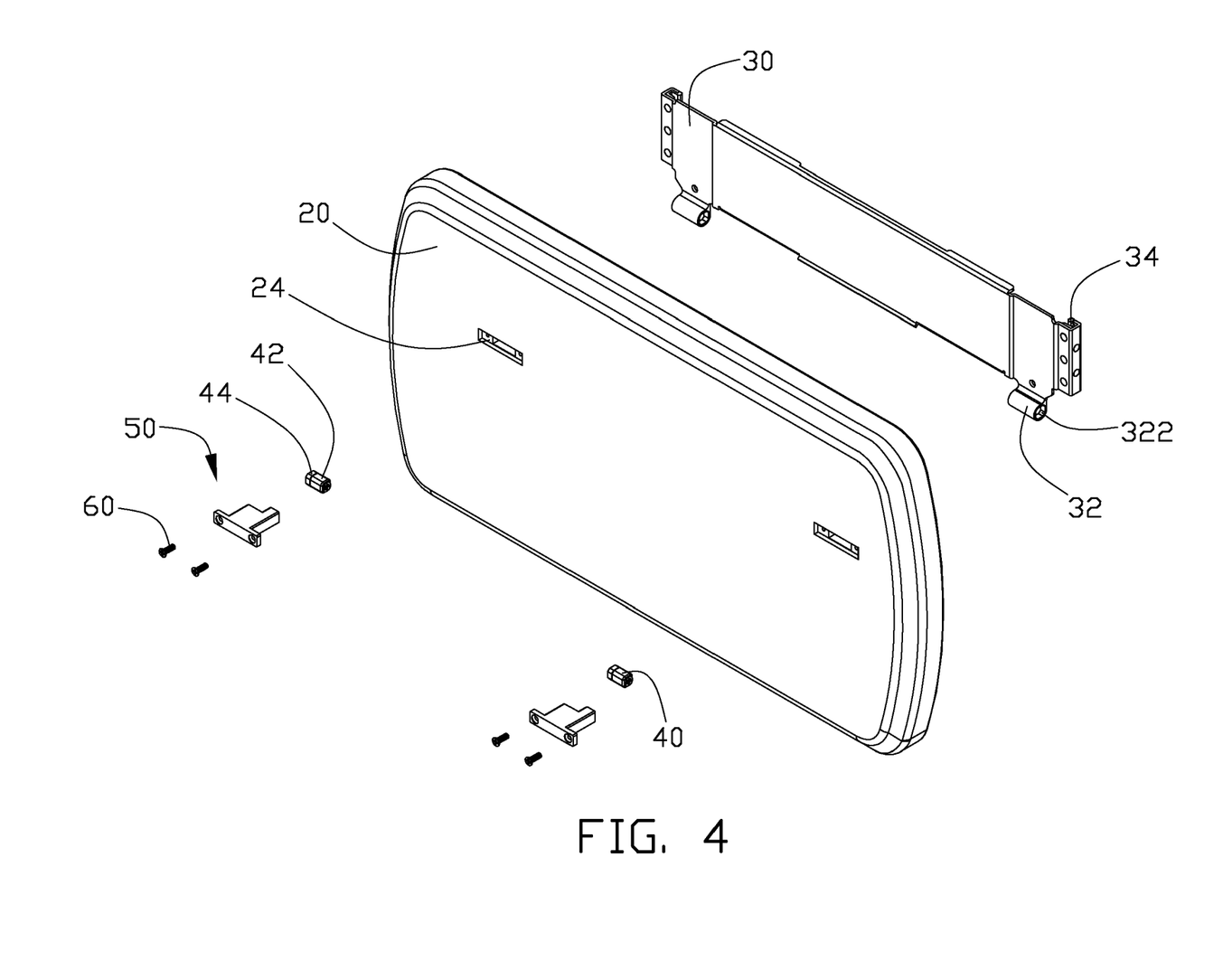
FIG. 4 is an enlarged, isometric view of part of FIG. 3, showing a rotating member with sleeves, two positioning members, and two hinges.
Figure 5:
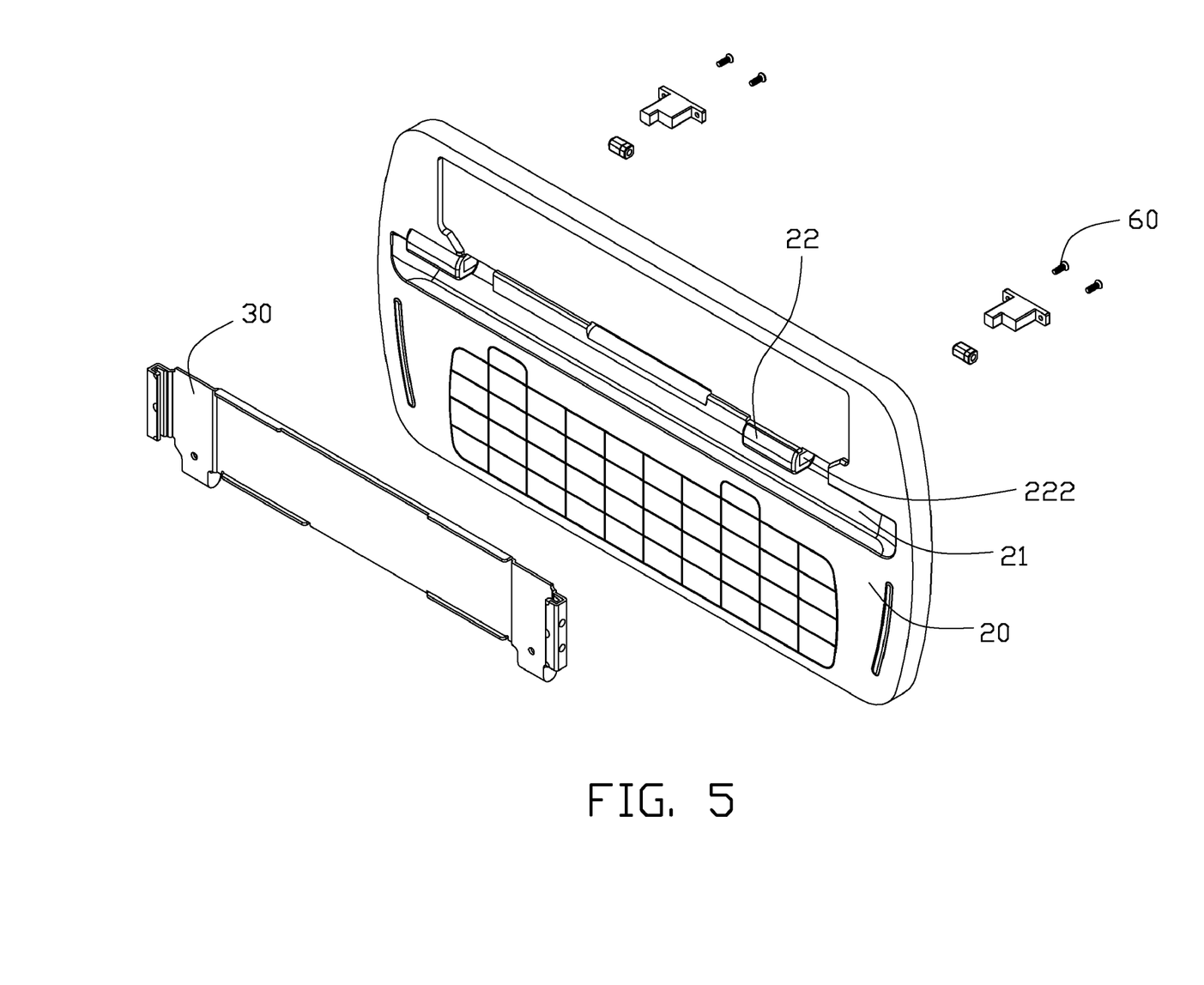
FIG. 5 is similar to FIG. 4, but viewed from another perspective.

Referring to FIGS. 4 and 5, a top portion of the main body 20 defines a receiving groove 21 for receiving a side of the display 10. The main body 20 includes two first sleeves 22 located on a side of the groove 21. Each first sleeve 22 axially defines a noncircular holding groove 222 therein. A bottom side of the main body 20 defines two mounting grooves 24. Each mounting groove 24 communicates with a corresponding holding groove 222.

Referring to FIG. 3 again, each of two opposite ends of the sliding piece 12 includes a sliding rail 122.

There is a sliding groove 34 defined in each of two opposite ends of the rotating member 30, to slidably receive the corresponding sliding rail 122 of the sliding piece 12. Two second sleeves 32 are formed at a bottom side of the rotating member 30. A noncircular holding hole 322 is axially defined in each second sleeve 32.

The two hinges 40 are used to pivotably connect the rotating member 30 and the main body 20.

Figure 6:
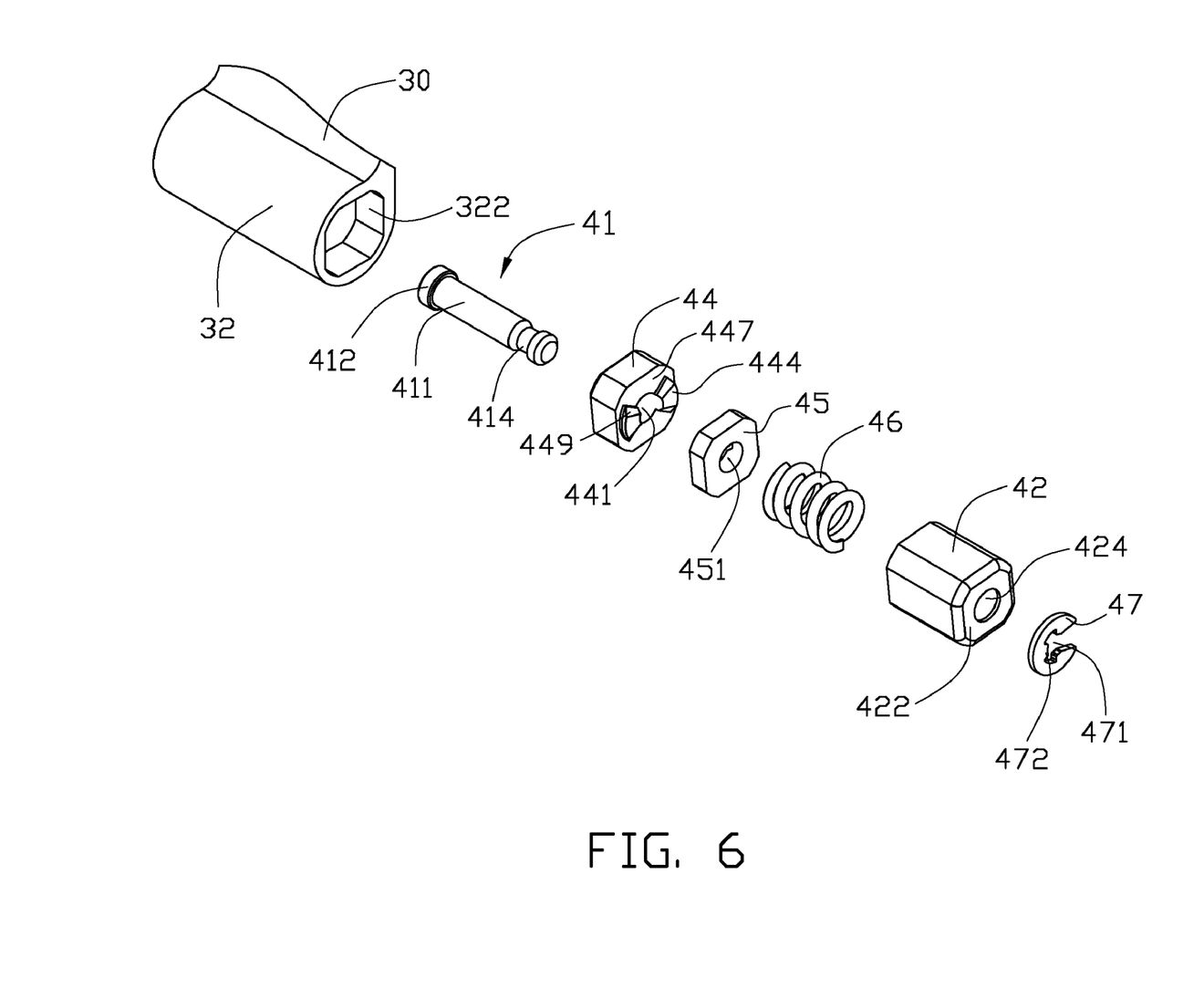
FIG. 6 is an exploded, isometric view of one hinge and one sleeve of the rotating member of the electronic device of FIG. 4.
Figure 7:
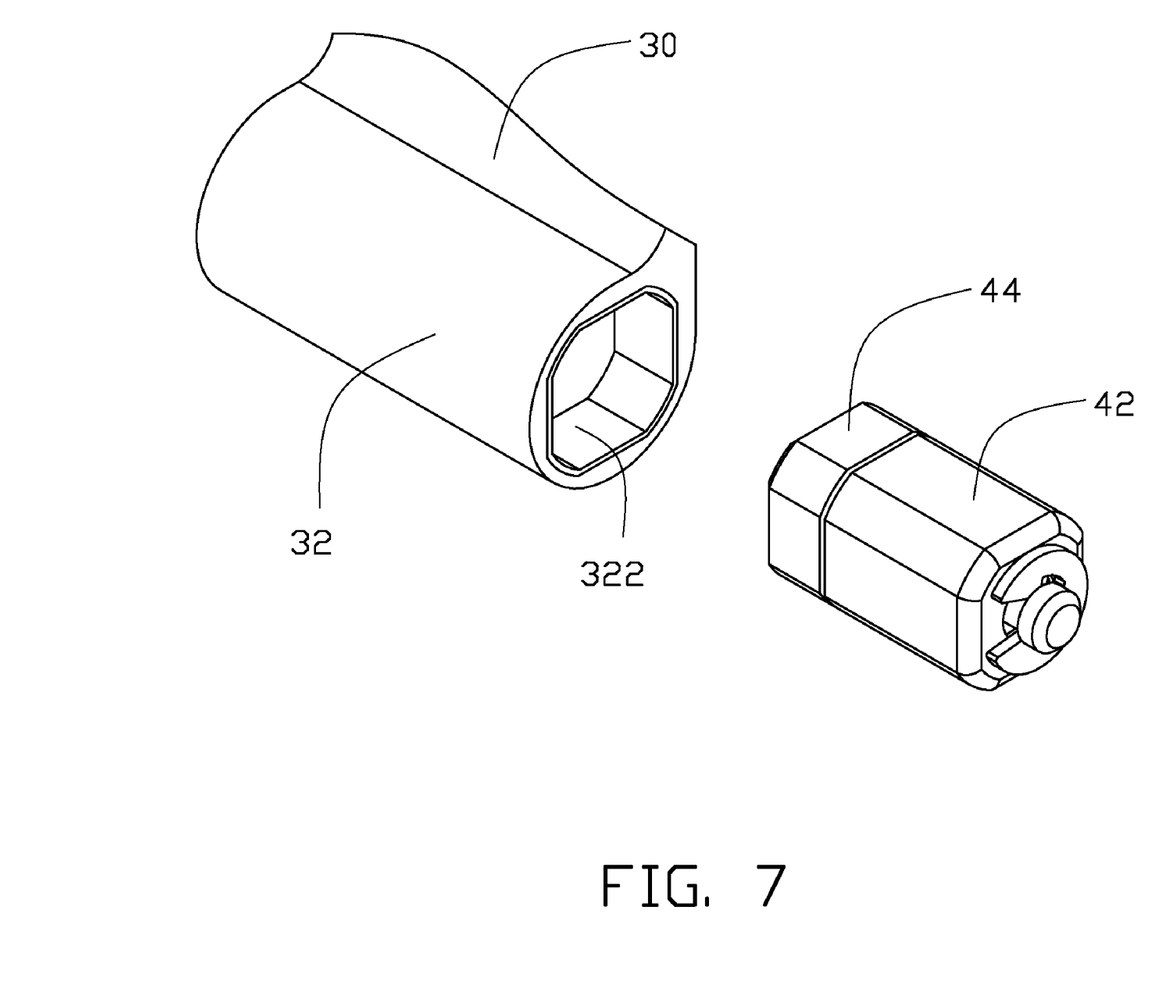
FIG. 7 is a partially assembled, isometric view of the hinge and the sleeve of FIG. 6.
Figure 8:
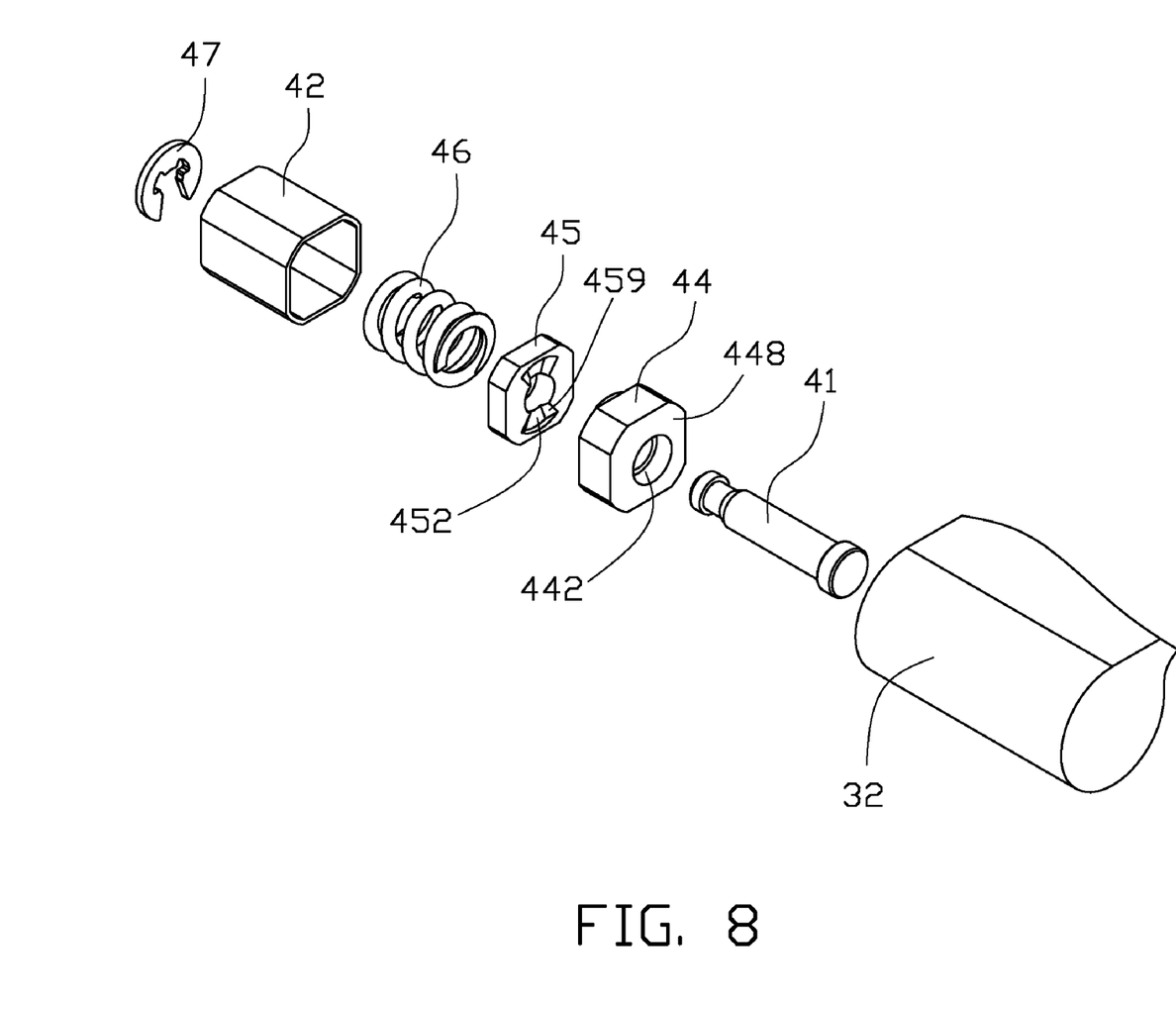
FIG. 8 is similar to FIG. 6, but viewed from another perspective.

Referring to FIGS. 6 to 8, each hinge 40 includes a shaft 41, a container 42, a first interfering member 44, a second interfering member 45, a resilient member 46, and a fastener such as C-shaped clip 47.

The shaft 41 includes a post 411, a head 412 formed on a first end of the post 411, and a groove 414 defined in a second end of the post 411.

A large opening (not labeled) is defined in one end wall of the container 42, and a small opening 424 is defined in an opposite end wall 422. A cross-section of the container 42 is rectangular for convenient mounting of the container 42. In an alternative embodiment, the container 42 may be differently shaped to enable convenient mounting in other devices.

The first interfering member 44 is configured to be secured in the holding hole 322 of the corresponding second sleeve 32. A cross section of the first interfering member 44 has a same shape and size as that of the holding hole 322. The first interfering member 44 includes a first side 447 facing the second interfering member 45, and a second side 448 opposite to the second interfering member 45. The first interfering member 44 defines a through step hole that includes a great receiving hole 442 opposite to the second interfering member 50, and a small through hole 441 communicating with the receiving hole 442 and facing the second interfering member 50. The step hole extends through the first interfering member 44. The first side 447 forms two positioning tabs 444 adjacent to and symmetrical about the through hole 441. Each positioning tab 444 forms two slope surfaces 449 on opposite ends thereof connecting to the first side 447.

The second interfering member 45 is substantially square-shaped, configured to be non-rotatably fixed in the container 42. The second interfering member 45 defines a through hole 451 configured to allow the post 411 of the shaft 41 being inserted therethrough. A side of the second interfering member 45 facing the first interfering member 40 defines two recesses 452 corresponding to the positioning tabs 444 of the first interfering member 44. Each recess 452 forms two slope surfaces 459 on opposites ends thereof connecting to the side of the second interfering member 45, for a corresponding positioning tab 444 easily sliding into or sliding out of the recess 452.

In one embodiment, the resilient member 46 is a coil spring. In an alternative embodiment, the resilient member 46 can be a resilient washer.

A cutout 471 is defined in the clip 47. A plurality of tenons 472 are extended from the clip 47 into the cutout 471.

In assembly of the hinge 40, the resilient member 46 and the second interfering member 45 are placed in the container 42. A first end of the resilient member 46 resists against the end wall 422 of the container 42, and a second end of the resilient member 46 resists against the second interfering member 45. The post 411 of the shaft 41 is inserted through the step hole of the first interfering member 44, the through hole 451 of the second interfering member 45, the resilient member 46, and the opening 424 of the container 42. The positioning tabs 444 of the first interfering member 44 are positioned in the corresponding recesses 452 of the second interfering member 45. The head 412 of the shaft 41 is received in the receiving hole 442 of the first interfering member 44, and the groove 414 of the post 411 is located outside of the container 42 through the opening 424. The clip 47 is engaged in the groove 414 of the post 411, with the tenons 472 tightly clutching on the post 411. The first interfering member 44 and the second interfering member 45 are capable of rotating relative to each other.

In assembly, the rotating member 30 is placed on the top of the main body 20, with the holding holes 322 being in alignment with the holding grooves 222 of the main body 20. Each hinge 40 is placed into the holding groove 222 of the corresponding first sleeve 22 through the corresponding mounting groove 24 from the bottom of the main body 20. The hinge 40 slides in the holding groove 222, with the first interfering member 44 being slid into the corresponding holding hole 322 while the container 42 left in the holding groove 222. A corresponding positioning member 50 is inserted into the holding groove 222 via the corresponding mounting groove 24. The positioning member 50 is pressed on the container 42, and resists against a side of the hinge 40 to limit the hinge 40 in the holding groove 222 and the holding hole 322. Two screws 60 are used to mount the positioning member 50 to the main body 20. Thus, the rotating member 30 is pivotably mounted to the main body 20 via the hinges 40.

The sliding piece 12 is mounted to the back of the display 10 via a plurality of screws. The sliding rails 122 of the sliding piece 12 slide into the corresponding sliding grooves 34 of the rotating member 30. Accordingly, the display 10 is movably mounted to the main body 20 via the sliding rails 122 sliding in the sliding grooves 34. When the bottom side of the display 10 is aligned with the receiving groove 21 of the main body 20, the rotating member 30 can be rotated on the main body 20 to adjust an angle between the display 10 and the main body 20. The bottom side of the display 10 is thus received in the receiving groove 21 to avoid interfering with the main body 20.

To close the PDA, the display 10 is rotated on the main body 20 until the positioning tabs 444 of the first interfering member 44 are located in the corresponding recesses 452 of the second interfering member 45. At this position, the display 10 is parallel with the main body 20, as shown in FIG. 1. The display 10 slides until covering the main body 20.

In the above embodiments, the resilient member 46 assists to drive the positioning tabs 444 to move into the corresponding recesses 452, bringing the display 10 parallel to the main body 20. Therefore, the display 10 will not scratch the main body 20 when the display 10 slides on the main body 20.

Referring again to FIG. 3, in addition, a plurality of elastic elements 70, such as tension springs, may be mounted between the sliding piece 12 and the rotating member 30. When the display 10 is rotated relative to the main body 20, the elastic elements 70 are distorted. When the display 10 is rotated to be parallel to the main body 20, the elastic elements 70 restore to drive the display 10 to slide on the main body 20.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for mounting a rotating member to a main body, comprising:
    a shaft, the shaft comprises a head formed on a first end of the shaft, and a groove is defined in a second end of the shaft;
    a first interfering member fitting about the shaft, and fixed to the rotating member,;
    a container fitting about the shaft, and fixed to the main body, the container comprises an end wall, a container hole is defined in the end wall for the shaft being inserted therethrough; and
    a second interfering member retained around the shaft, and non-rotatably received in the container;
    a resilient member retained around the shaft, a first end of the resilient member resists against the end wall of the container, and a second end of the resilient member resists against the second interfering member;
    a fastener, the fastener clasps the shaft in the groove to limit the first interfering member, the second interfering member, the resilient member, and the container between the fastener and the head of the shaft; and
    the fastener defines a cutout, a plurality of tenons is extended from the fastener into the cutout, to clutch on the shaft
    wherein the first interfering member comprises a first side facing the second interfering member and a second side opposite to the first side, the first interfering member defines a through step hole that comprises a great receiving hole through the second side and a small through hole through the first side communicating with the great receiving hole, the great receiving hole receives the head of the shaft therein, the small through hole allows the shaft to be inserted therethrough; and the first side of the first interfering member forms at least one positioning tab, the second interfering member comprises a second side facing the first interfering member and defining at least one recess configured to allow the at least one positioning tab to be positioned therein.

2. The hinge of claim 1, wherein a cross-section of the container is rectangular or other noncircular shaped for conveniently mounting the container, a cross section of the first interfering member is noncircular shaped configured to be secured.

* * * * *